US006937731B2

(12) United States Patent
Chiu (10) Patent No.: US 6,937,731 B2
(45) Date of Patent: Aug. 30, 2005

(54) END TO END REAL-TIME ENCRYPTING PROCESS OF A MOBILE COMMERCE WAP DATA TRANSMISSION SECTION AND THE MODULE OF THE SAME

(75) Inventor: Hung-Che Chiu, Taipei (TW)

(73) Assignee: Mitake Information Corporation, Taipei (TW)

(*) Notice: Subject to any disclaimer, the term of this patent is extended or adjusted under 35 U.S.C. 154(b) by 837 days.

(21) Appl. No.: 09/804,258

(22) Filed: Mar. 13, 2001

(65) Prior Publication Data

US 2002/0131598 A1 Sep. 19, 2002

(51) Int. Cl.$^7$ ................................. G06F 7/60
(52) U.S. Cl. ....................... 380/270; 713/201
(58) Field of Search ................. 713/201; 705/79, 705/67; 709/203; 380/270

(56) References Cited

U.S. PATENT DOCUMENTS 6,002,772 A * 12/1999 Saito ........................... 705/58
6,223,291 B1 * 4/2001 Puhl et al. ................... 713/201

OTHER PUBLICATIONS

Schneier "Applied Cryptography", 1996, John Wiley and Sons, Inc, 2$^{nd}$ Editin, pp. 170–175, 181–182, 464–468.*

* cited by examiner

Primary Examiner—Gregory Morse
Assistant Examiner—Thomas Ho
(74) Attorney, Agent, or Firm—Rosenberg, Klein & Lee (57) ABSTRACT

An end to end real-time encrypting process of a mobile commerce WAP data transmission section and the module of the same are disclosed. The wireless application environment (WAE) is used as a technical platform. An information encryption code security system matching a public key infrastructure is installed in the WML server end. This system includes a handset software encryption and decryption module, a cipher server, and a key management. The added cipher server dynamically downloads a public key using the HTTP service through a WAP gateway of WAN, GSM/GPRS/CDMA and other digital mobile system. When the user is desired to execute an M-commerce, the user may input commerce service according WML and then the input data is up-linked through an encryption and decryption process of the handset encryption and decryption module. After the information transfers to the WML server, it is decrypted by a public key.

4 Claims, 11 Drawing Sheets

| | Account Number | | | | | | Encrypted number | Money transfer | Length of the plain text |
|---|---|---|---|---|---|---|---|---|---|
| | Code | Number of the branch | Subject | Account number | Check number | Sub-number | | | |
| Plain | 097 | 092 | 10 | 12345 | 8 | 25 | 1234 | 9999 | 24 |
| Decimal | 092709210 | | | 12345825 | | | 12349999 | | Na |
| Hex | AB02DE | | | 8D5C43 | | | 68C456 | | Na |
| Hex | AB | 02 | DE | 8D | 5C | 43 | 68 | C4 | 56 | Na |
| Decimal ANSI Code | 171 | 2 | 222 | 141 | 92 | 67 | 104 | 196 | 86 | Na |
| Plain ANSI CharSet | C(171) | C(2) | C(222) | C(141) | C(92) | C(67) | C(104) | C(196) | C(86) | 9 |
| Note | 1. Plain: Plain text<br>2. Hex: Hexadecimal system<br>3. Decimal: Decimal system<br>4. ANSI Code: American National standard institute code<br>5. ANSI CharSet: American National standard institute character set C(N) | | | | | | | | | |

| | Account Number | | | | | | Encrypted number | Money transfer | Length of the plain text |
|---|---|---|---|---|---|---|---|---|---|
| | Code | Number of the branch | Subject | Account number | Check number | Sub-number | | | |
| Plain | 097 | 092 | 10 | 12345 | 8 | 25 | 1234 | 9999 | 24 |
| Decimal | 092709210 | | | 12345825 | | | 12349999 | | Na |
| Hex | AB02DE | | | 8D5C43 | | | 68C456 | | Na |
| Hex | AB | 02 | DE | 8D | 5C | 43 | 68 | C4 | Na |
| Decimal ANSI Code | 171 | 2 | 222 | 141 | 92 | 67 | 104 | 196 | 86 | Na |
| Plain ANSI CharSet | C(171)C(2) | | C(222) | C(141) | C(92) | C(67) | C(104) | C(196)C(86) | 9 |
| Note | 1. Plain: Plain text<br>2. Hex: Hexadecimal system<br>3. Decimal: Decimal system<br>4. ANSI Code: American National standard institute code<br>5. ANSI CharSet: American National standard institute character set C(N) | | | | | | | | |

| ITEM | STK | WAP |
|---|---|---|
| INFORMATION TRANSMISSION WAY | BRIEF | DATA |
| CHARGING WAY | TIMES FOR TRANSMITTING THE BRIEF | COMMUNICATION TIME |
| OPERATION WAY | OFF-LINE OPERATING SERVICE OF COMPACT ITEM, TITLES, AND SIMPLE TRANSACTIONS | OPERATIONG COMPLEX, DESCRIBED, AND INTERACTIVE SERVICES THROUGH A DATA CONNTING WIRE |
| TECHNOLOGICAL MATURITY AND TRANSMISSION SECURITY | GSM PHASE 2+, HIGH TECHNICAL LEVEL, HIGH END TO END OPERATION, SECURITY IN END TO END COMMUNICATION, BUT NO ACKNOWLEDGE MECHANISM | NOT COMPLETE IN THE CONVENTIONAL WAP 1.1 SECURITY, NO CLIENT ENCRYPTION, ACKNOWLEDGE AND UN-REJECT MECHANISM, WHILE AS IT IS USED IN THE PRESENT INVENTION, THEN IT IS MATCHED TO THE END TO END SECURITY MECHANISM MATCHING PCI CONSTRUCTION |
| HANDSET | WIDELY USED TO SUPPORT STK HANDSET | NOT WIDELY USED TO SUPPORT WAP HANDSET, IT IS PREDICTED THAT IN 2000, THERE ARE MORE HANDSETS TO BE MASS-PRODUCED FOR SUITING THE WIDE BAND AGE |

END TO END REAL-TIME ENCRYPTING PROCESS OF A MOBILE COMMERCE WAP DATA TRANSMISSION SECTION AND THE MODULE OF THE SAME

FIELD OF THE INVENTION

The present invention relates to an end to end real-time encrypting process of a mobile commerce WAP data transmission section and the module of the same. The wireless application environment (WAE) is used as a technical platform. An information encryption code security system matching a public key infrastructure is installed in the wireless markup language (WML) server end. This added mechanism can realize the security of end to end real-time encrypting process of a mobile commerce wireless application protocol (WAP) data transmission section.

BACKGROUND OF THE INVENTION

Figure 1:
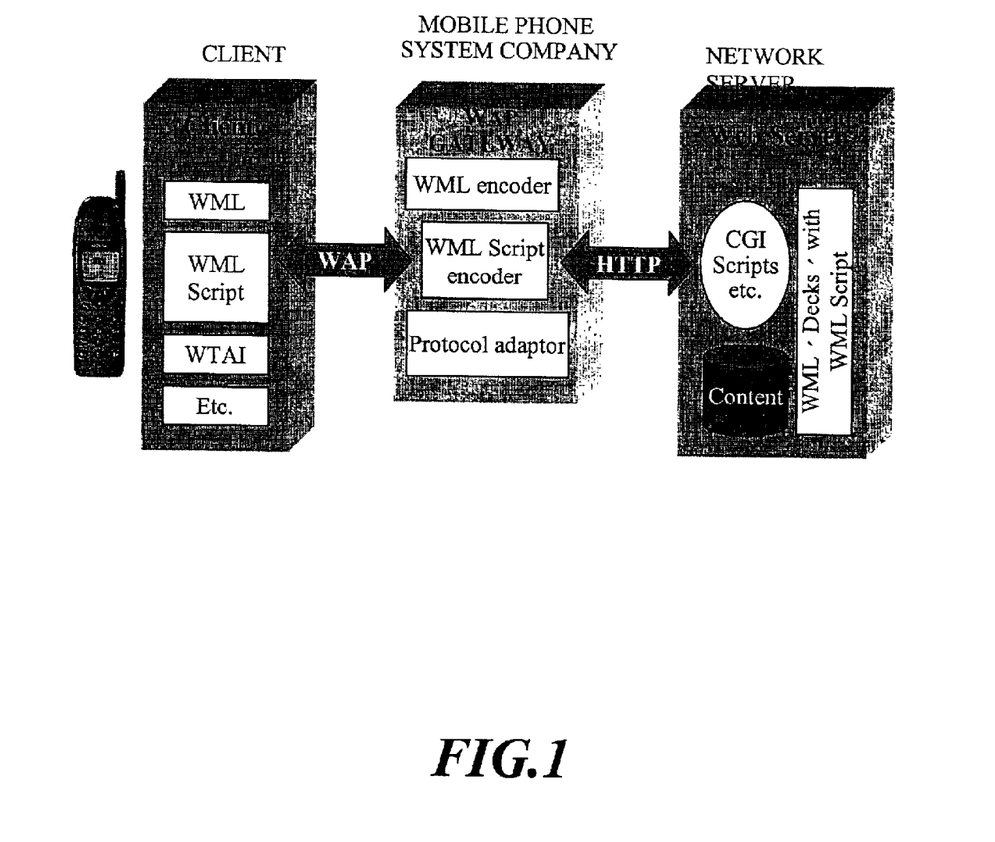
FIG. 1 shows the construction of the wireless application protocol.

The wireless application protocol (WAP) specifies the protocol for executing the network information transmission on a wireless equipment, such as a mobile phone or a PDA. The WAP is developed for wireless equipment since the environment is different from other devices and therefore, a dedicated application protocol is necessary for supporting these applications. The superior design of WAP cause that it is compatible to most of the communication network, for example, GSM, GPRS, PDC, CDPD, CDMA, TDMA, PHS, DECT and third generation mobile phone (3G). Under the system of GSM, WAP can be executed through a short message service (SMS) or a circuit switched data (CSD). CSD is possible to be commercialized due to the bandwidth thereof. WAP has two modes to be used in wireless networks, one is used as a WAP gateway between the client and the Web server; another is directly embedded into the WAP application server connected to the client, here the client is a wireless communication equipment supporting the WAP, while the web server is a network station server installed in Internet. The WAP gateway is an interface software installed between the GSM network and the WAN wide area network for converting the encryption protocol of the WAP and WTLS into HTTP and SSL/TLS encryption protocol for assisting WML format document and can be acquired from the current Internet. It includes a WML Encoder, a WML script compiler, a protocol adaptor, and others (referring to FIG. 1). The WAP application server is embedded with functions of the WAP gateway for providing to the clients.

However, the defects of the 2 phase security is that a great threaten occurs as the mobile commercial information is transferred to the WAP gateway for being converted into plain text since the current two phase mechanism is divided into (1) WTLS encryption in the transmission from a handset to the engaged; and (2) SSL/TLS encryption in the transmission from the WAP gateway to the WML server. Since the specifications of the WTLS and TLS are different, the WAP gateway must restore the WTLS encryption text into plain text, then the plain text is encrypted by TLS. Therefore, the data must be restored into plain text in the mobile phone manage and then is encrypted so as to generate a defect in the process. Therefore, the present invention is dedicated to an end to end encryption technology for compensating the insufficiency of current structure and can be used to the transaction of WAP platform (such as financial process in a bank system, transaction stocks, intra-communication in an office, transaction of business, etc.

SUMMARY OF THE INVENTION

The present invention relates to an end to end real-time encrypting process of a mobile commerce WAP data transmission section and the module of the same. The feature thereof is that a wireless application protocol (WAP) is used as a technical platform. An information encryption code security system matching a public key infrastructure is installed in the WML server end of the current mobile server of a wireless service provider. This system includes a handset software encryption and decryption module, a cipher server, and a key management. The added cipher server may dynamically download handset software encryption and decryption module and the public key generated by the key management to the client, such as a mobile phone or a personal digital assistant, using the HTTP service (hyper text transmission protocol service) through a WAP gateway of WAN (wide area network), GSM/GPRS/CDMA and other digital mobile system.

When the user is desired to execute an M-commerce, the user may input commerce service according to the indication of the wireless markup language (WML) and then the input data is up-link through an encryption and decryption process of the handset encryption and decryption module. After the information transfers to the WML server, it is decrypted by a public key correspondent to the cipher server. Then the plain text is transferred to the WML server for executing the following process. By the added mechanism, the end to end security of the WAP mobile commerce information exchange is realized so as to improve the defect of the 2-phase security in the current WAP (edition 1.1) construction.

Figure 2:
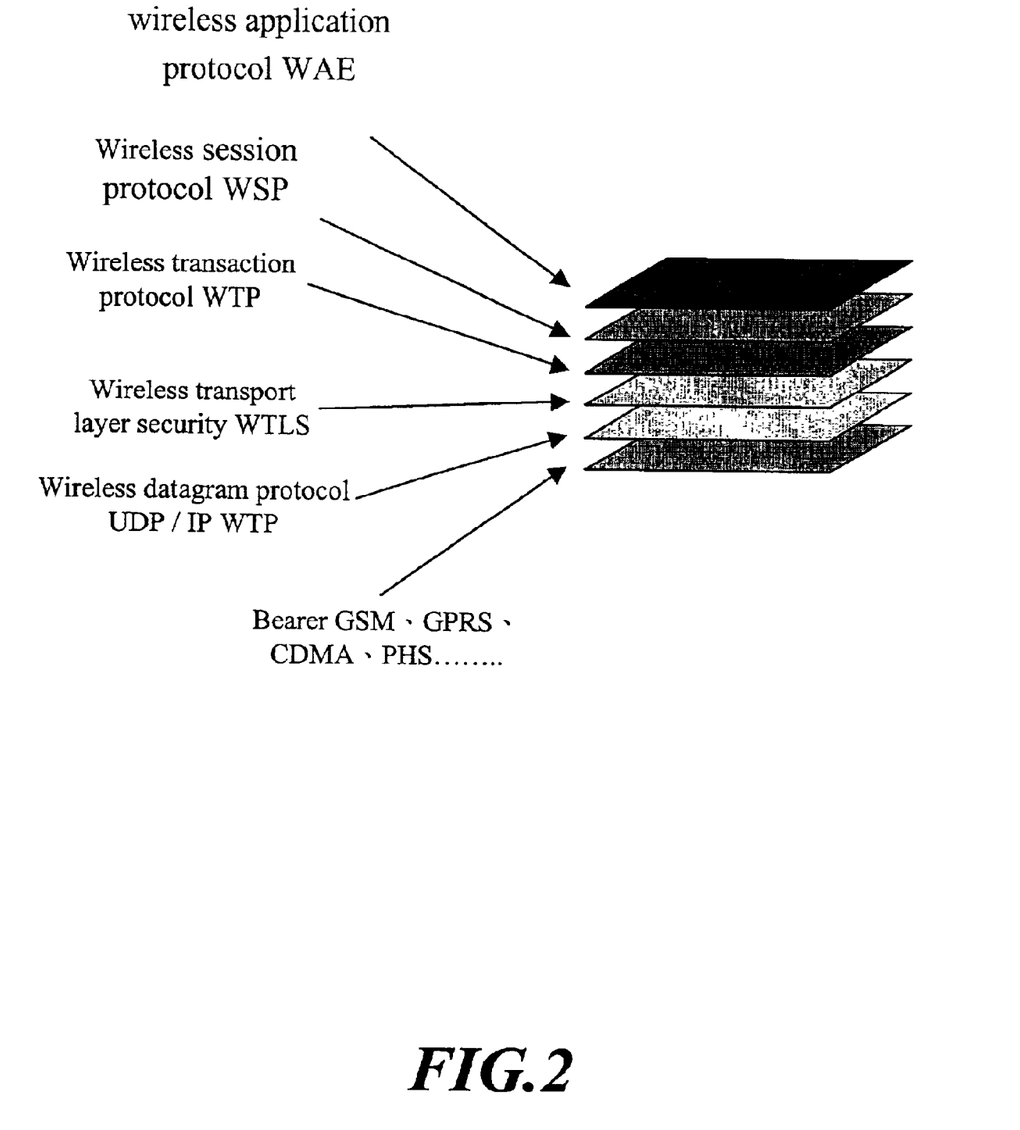
FIG. 2 shows the hierarchy structure of a WAP communication protocol.

The WAP communication protocol defined by the WAP Forum has six layers (referring to FIG. 2). In the present invention, the uppermost layer of the wireless application environment (WAE) is used as a developing platform and executing environment. This is different from the current WTLS mechanism which is built in the fourth layer of security layer. Since the WAE layer is based on the security layer. Therefore, other than providing a security, the present invention has the effect of being protected by the WTLS mechanism. This is one feature of the present invention.

Therefore, the present invention provides an end to end real-time encrypting module of a mobile commerce WAP data transmission section, in that the uppermost layer of the wireless application environment (WAE) is used as a developing platform and executing environment. In the module, an information encryption security system is added to the WML server of the wireless content service provider (WCP). The system comprises a handset software encryption and decryption module, a cipher server and a key management.

The present invention provide an end to end real-time encrypting process of a mobile commerce WAP data transmission section, in that the uppermost layer of the wireless application environment (WAE) is used as a developing platform and executing environment. The process includes steps of:

an information encryption security system is added to the WML server of the wireless content service provider (WCP). The system comprises a handset software encryption and decryption module, a cipher server and a key management.

The various objects and advantages of the present invention will be more readily understood from the following detailed description when read in conjunction with the appended drawing.

DETAILED DESCRIPTION OF THE PREFERRED EMBODIMENTS

To further understand the present invention, a detail description of the present invention will be described in the following with the appended drawings. Those skilled in the art may completely understand the objects, characteristics and features of the present invention from these descriptions. However, those descriptions and the appended drawings are only used to describe the present invention instead of being used to confine the spirit and scope of the present invention defined in the appended claims.

Figure 3:
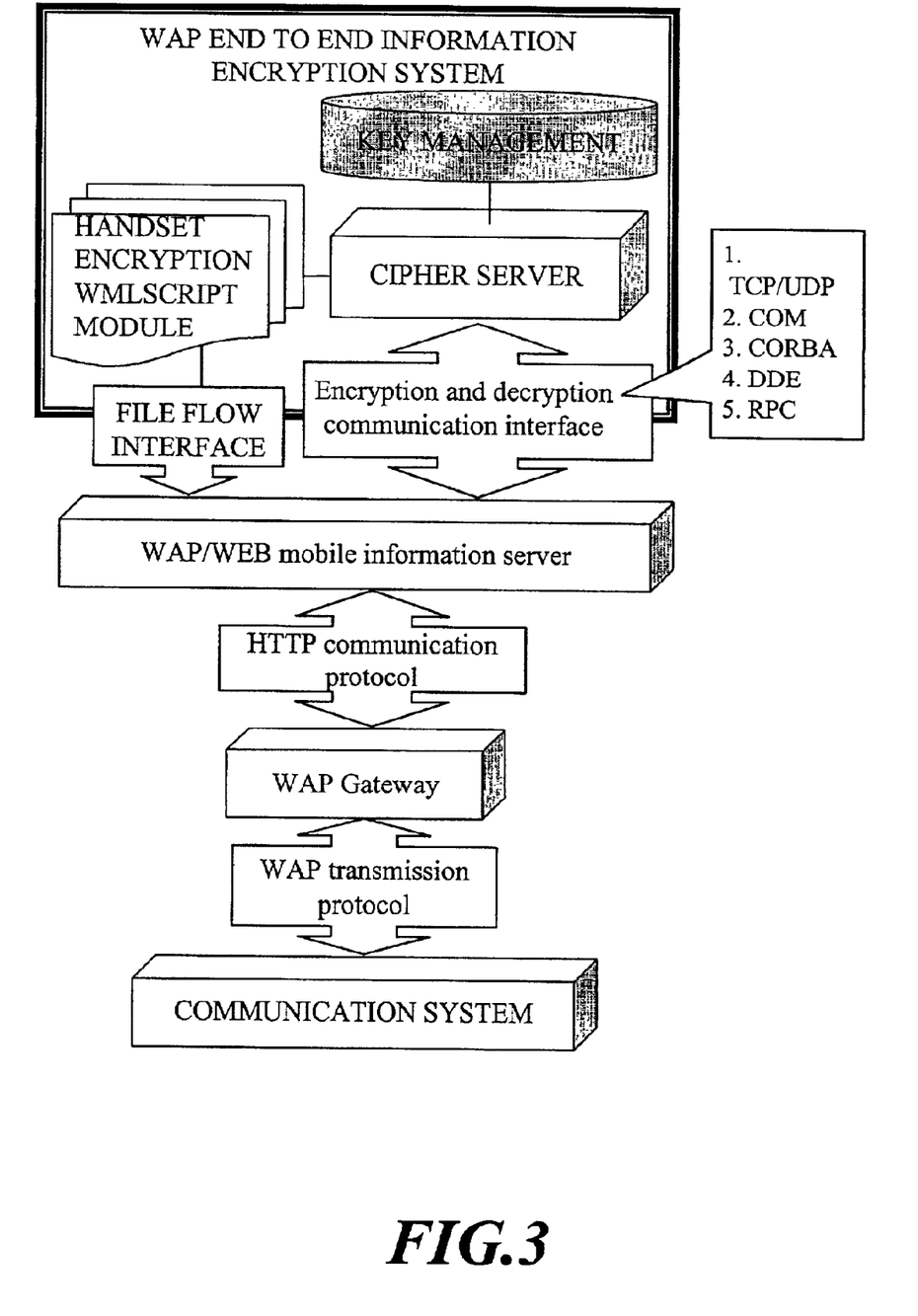
FIG. 3 is a structure view of the WAP end to end information encryption system according to the present invention.

The present invention provide an end to end real-time encrypting process of a mobile commerce WAP data transmission section, in that the uppermost layer of the wireless application environment (WAE) is used as a developing platform and executing environment. An information encryption code security system (referring to FIG. 3) matching a public key infrastructure is installed in the WML server end of the current mobile server of a wireless service provider. This system includes a handset software encryption and decryption module, a cipher server, and a key management. The system can realize the end to end security of WAP mobile commerce so as to improve the defect of current 2-phase security.

Furthermore, the encryption and decryption principle of the public key mechanism is used in the present invention. The public key and private key generated by the key management are used alternatively, and thus, not only it can be used to the object of encryption, but also the "un-reject" function in certification acknowledge (CA) is achieved. Therefore, the possibility of realizing mobile commerce is improved greatly. Another, to solve the defect of low efficiency in mobile commerce, in the present invention, a pre-compressor is installed in the handset software encryption and decryption module. The pre-compressor with a compressing ratio of one third and zero distortion is used to process the original plane text so as to greatly increase the efficiency of the handset. Consequently, the application of the present invention to be used in mobile commerce is improved.

The Development Platform and Operating Platform of the Present Invention

The WAP communication protocol defined by WAP Forum is divided into six layers (referring to FIG. 2), which are 1. WAE (wireless application environment), the WAE defines the communication protocols in the application layer. The WAE is a wireless application environment combined with WWW technology and the property of a wireless communication. The WAE causes the network systems and the service providers may provide contents and services through a micro browser.
2. WSP (wireless session protocol) WSP is a communication protocol of the session layer, which provides two services including a contiue connecting service based on WTP and discontinuous connecting service based on WDP.
3. WTP (wireless transaction protocol): WTP is a communication protocol based on the transaction layer of the WDP, which is designed for a small client interface (for example, mobile phone).
4. WTLS (wireless transport layer security) WTLS is the security protocol based on a security protocol according to the industrial TLS protocol (i.e., secure socket layer, SSL). The WTLS is designed to be a security layer on the transport layer and is to modify the communication environment in a narrow bandwidth.
5. WDP (wireless datagram protocol) WDP is a communication protocol of a transport layer, which is suitable to be constructed on the data service of different communication technology, and may provide a common communication interface for providing upper layer communication protocol of WAP so that the communication protocol including application layer, session layer, and security layer can be operated directly on the WDP.
6. Bearer (data service of the bottom layer) WAP is designed to be a communication protocol which can be supported by various communication technology, and thus it can be built on various communication service, comprising: short message service (SMS), package data, circuit-switched data, etc.

In the present invention, the uppermost layer of the wireless application environment (WAE) is used as a developing platform and executing environment. This is different from the current WTLS mechanism which is built in the fourth layer of security layer. Since the WAE layer is based on the security layer. Therefore, other than providing a security, the present invention has the effect of being protected by the WTLS mechanism. This is one feature of the present invention.

Figure 4:
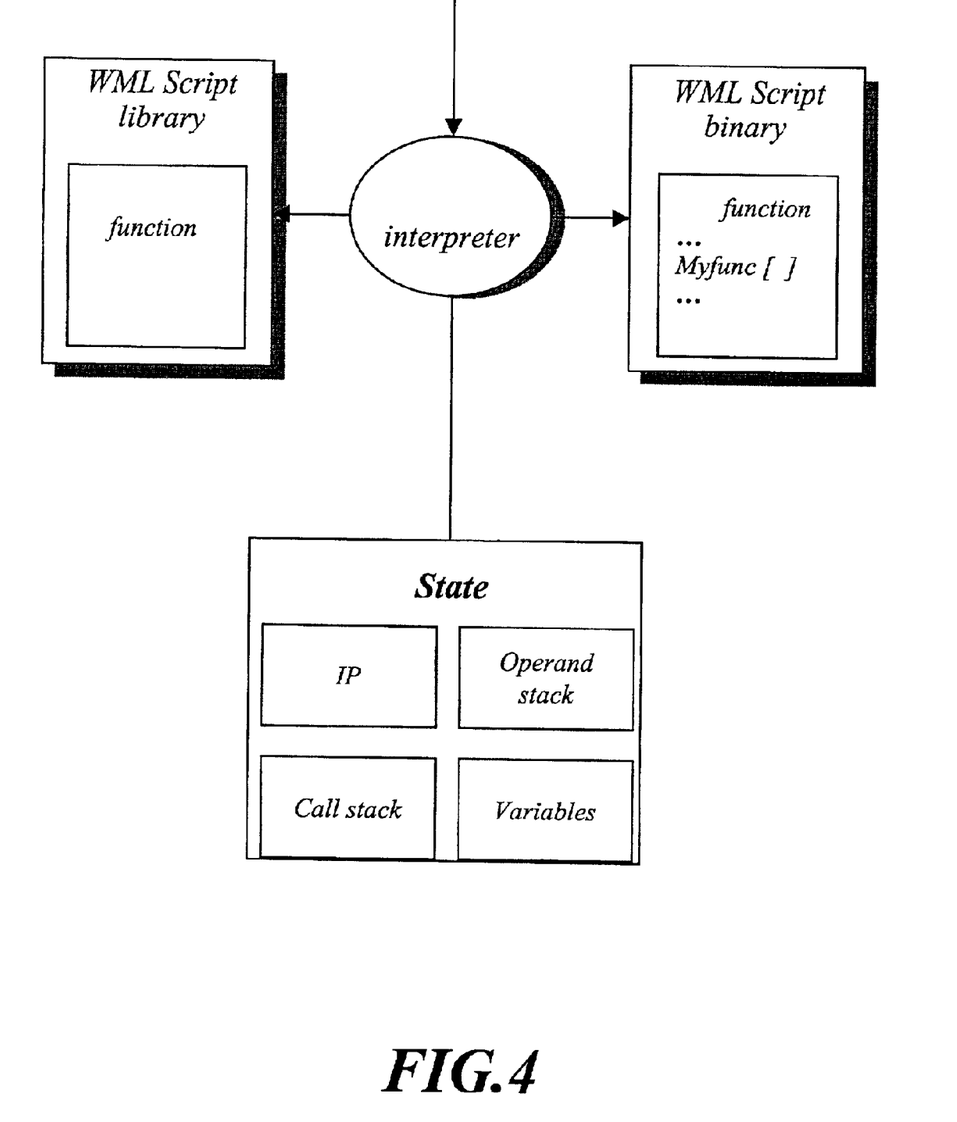
FIG. 4 shows the construction of the WAE as an executing environment of a handset encryption and decryption module in the present invention.

The WAE application layer executing environment may be used to interpret wireless markup language, and wireless markup script language, and thus is a handset software encryption and decryption module of the security mechanism of the present invention. The interpreter of the WML-Script language in the mobile phone can directly access the data variables of WML format through a stack memory (referring to FIG. 4). Therefore, the input data from WML document can be processed and operated by the handset encryption and decryption module, and then is transferred to a far end mobile information server WML server so that the process of transmission is protected.

The Mechanism of Data Compression of the Present Invention.

Figure 5:
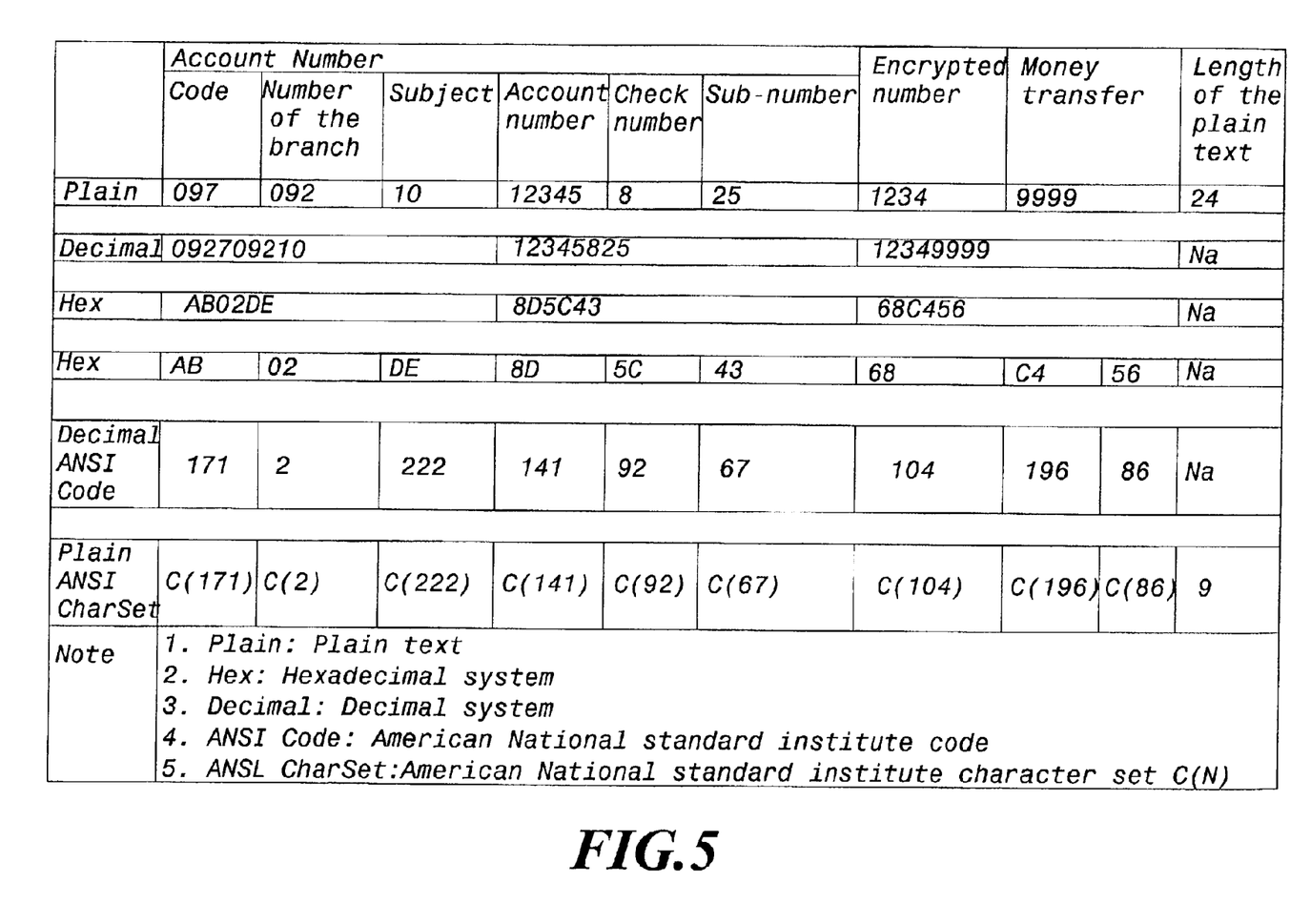
FIG. 5 shows the process for the algorithm of the pre-compressor of the present invention, in that the exchange of a bank account is used as an example.

Since the operation of the public key algorithm is complex and needs much time, in order to improve the efficiency of the mobile phone WAE executing environment and the convenience thereof, a pre-compressor is added to the handset software encryption and decryption module of the present invention Under the consideration that the security mechanism of the present invention has a maximum compatibility in the executing environment and convenience of the succeeding updating, a pre-compressor is installed in the handset software encryption and decryption module. The pre-compressor with a compressing ratio of one third and zero distortion is used to process the original plane text so as to greatly increase the efficiency of the handset. Thereby, the present invention can be massively used in the mobile commerce. This is another feature of the present invention. The basic principle of the pre-compressor is that by a numerical code—character code conversion theory and a selection technique of carrying, the WML text is converted efficiently so as to generate a high compression ratio. Referring to FIG. 5, the compressing process of the pre-compressor of the present invention is illustrated. In the drawing, an example of a transaction of account exchange in a man-free bank is illustrated. The account number having an original length of 24 characters is compressed as into a character set of ANSI (American National Standard Institute) having a length of 8 characters. Therefore, in a high compressing speed, a high compressing ratio is achieved.

The compressing procedure of the pre-compressor will be described in the following:

1) The original data is divided into several unit character string (UnitBuf), and each character string has 8 or 9 characters;
2) Each unit character string is converted into a decimal value (Unitval);
3) Each decimal value is converted into a unit character string (oxUnitBuf) of hexadecimal system;
4) Each unit character string (oxUnitBuf) of hexadecimal system is divided into two unit character sets (oxCharBuf);
5) Each unit character set (oxCharBuf) is converted into a decimal character code between 0~255; and
6) Each character code is directly converted a respective ANSI character set.

In the aforesaid step 1), to use 8 or 9 characters as an unit is based on the maximum data length supported by a mobile phone WAE executing environment of 64 bits, which can be converted into a decimal value of between −2147483647~2147483647. If the data is represented by a decimal system, it has a length of 10. Therefore, in order to avoid the data from overflowing, 8 or 9 characters are used as a unit.

The Basis of the Encryption Mechanism in the Present Invention.

Figure 6:
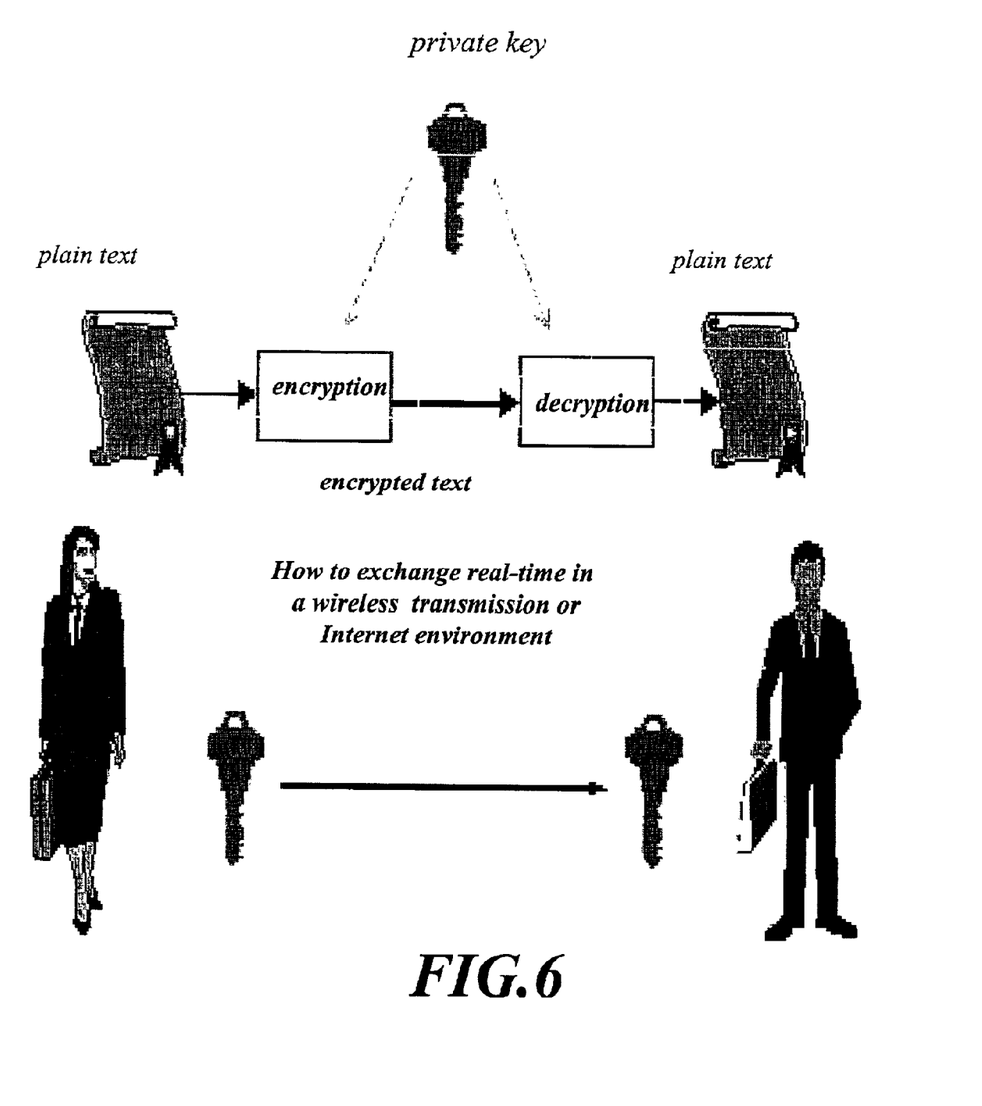
FIG. 6 shows the operation of the symmetric key encryption mechanism in the present invention.

As above description, An information encryption code security system matching a public key infrastructure is installed in the WML server end of the current mobile server of a wireless service provider. This system includes a handset software encryption and decryption module, a cipher server, and a key management. In the current encryption code technology, there are two primary encryption systems. The first one is a symmetric key encryption system and the second one is an asymmetric system (or briefly, called as a public key encryption system). The symmetric key encryption system has an advantage of quick encryption and decryption. However, since in this system, the encryption key and decryption key are identical keys. How to transfer the key to the encryption information receiver, and how to share the secret key by the transmitter and receiver are main concerns in the symmetric key encryption system (referring to FIG. 6). Therefore, the symmetric key is unsuitable for a WML server registered by many people, i.e., it is not suitable for a client-server mobile commerce construction.

The public key encryption system has improved the defect in the symmetric key encryption system. In this system, the encryption key is not identical to the decryption key. Each key pair has two symmetric keys, one is a public key and the other is a private key. In using, the public key can be published to anyone communicated with one own the public key. When anyone is desired to transmit information to the owner of the public key, the information can be encrypted through the public key and then transferred to the receiver having the public key. However, only the private key with respect to this public key can decrypt this information. Therefore, this asymmetric key cause two persons never contact with one another to communicate with one another without interchanging keys in advance.

Figure 7:
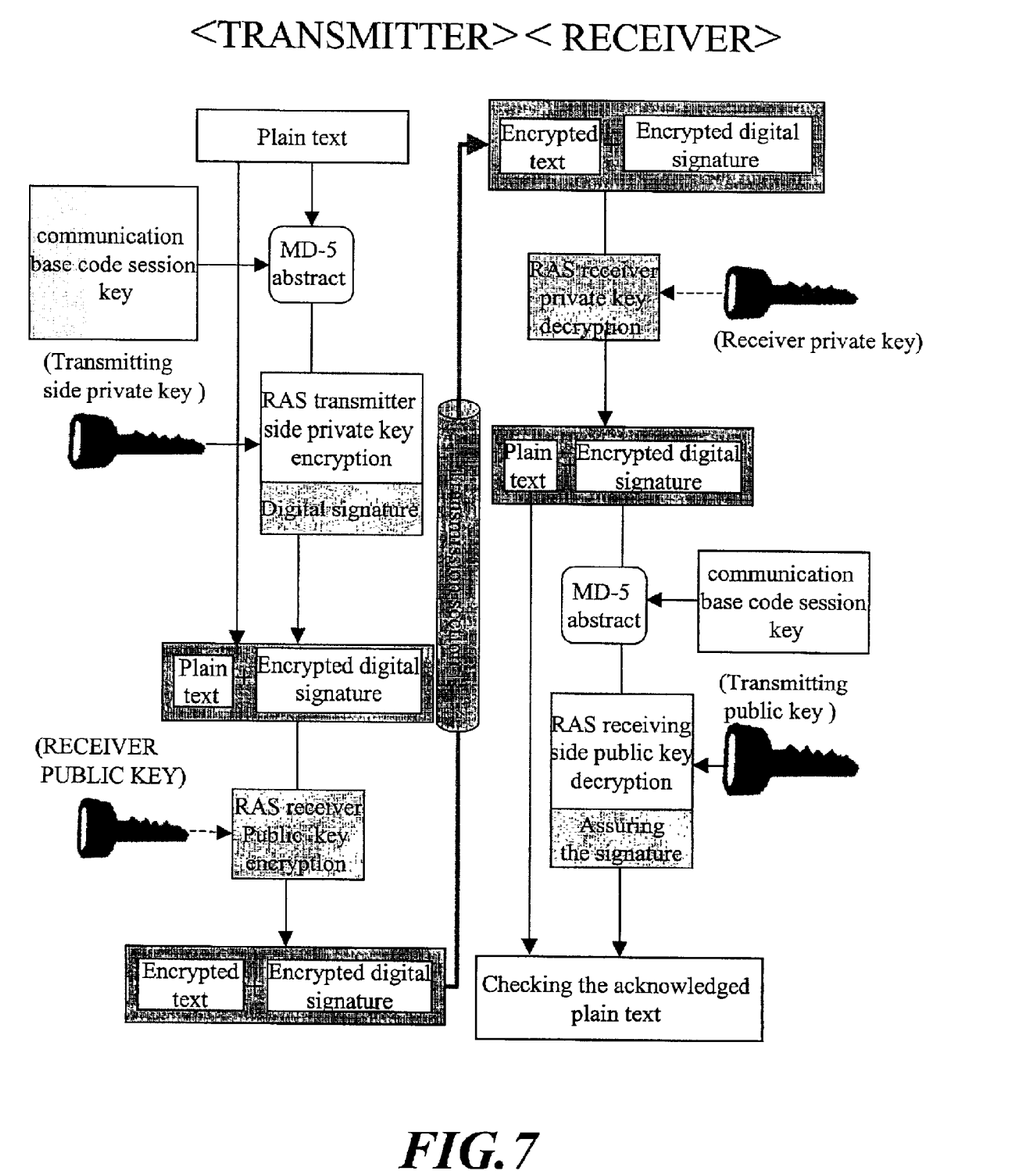
FIG. 7 shows the operation of a public key encryption mechanism (RSA is used as an example) in the present invention.
Figure 8:
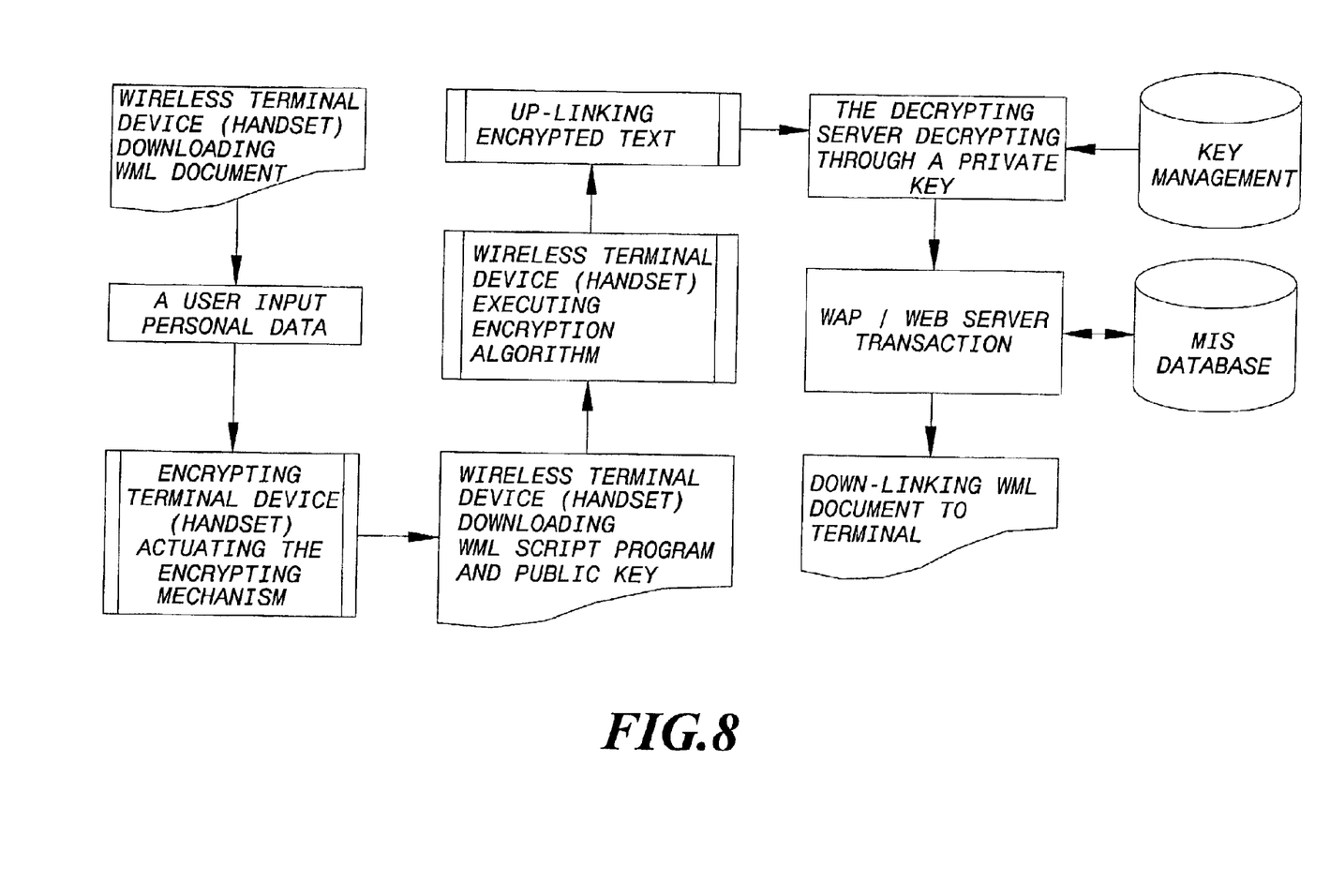
FIG. 8 shows the process of the WAP end to end encryption according to the present invention.

On the contrary, when the information is encrypted by a private key, those having a public key with respect to the private key can be used to decrypt the information, and thus, the private key can be used as a signature to the information. The famous asymmetric key encryption system and digital signature algorithm includes Deffi-Hellman, RSA, DSA, ElGamal, M-H Knapsack and Rabin, etc. Since a public key symmetric key is not necessary to exchange keys in advance, it has the advantage of secret communication. Therefore, in the present invention, the public key encryption is used in the design of end to end real-time encrypting process of a mobile commerce WAP data transmission section and the module of the same (referring to FIG. 7).

The Encryption System of the Present Invention

1. The Handset Encryption and Decryption Module and Cipher Server

In the present invention, An information encryption code security system matching a public key infrastructure is installed in the WML server end of the current mobile server of a wireless service provider. This system includes a handset software encryption and decryption module, a cipher server, and a key management.

When an user registers into the WML server of WCP through a WAP network, the WML server will inform the cipher server to be responsible for actuating the public key remained in the handset software encryption and decryption module and the key management through the cipher server of the present invention for the inter-process communication interface, such as a TCP/UDP communication protocol, a COM object mode interface, a CORBA object model interface, a DDE dynamic data interchange and RPC far-end process calling, etc., provided by the operation system of various computers.

The public key is downloaded to the client, such as a mobile phone or a personal digital assistant, using the HTTP service (hyper text transmission protocol service) through a WAP gateway of WAN (wide area network), GSM/GPRS/CDMA and other digital mobile system. When the user is desired to execute an M-commerce, the user may input commerce service according to the indication of the wireless markup language (WML) and then the input data is up-linked through an encryption and decryption process of the handset encryption and decryption module. After the information transfers to the WML server, it is decrypted by a public key correspondent to the cipher server. Then the plain text is transferred to the WML server for executing the following process.

On the contrary, if it is desired to down-link the personal commercial information (such as checking account in a bank), the user must input a private key to be left in the stack memory of the mobile WAE environment as a standby. When the WML server transfers the personal commercial information to be down-linked to cipher server and inform the cipher server to open the public key remained in the handset software encryption and decryption module and key management for executing an encryption algorithm in the server end in advance. Then, the handset software encryption and decryption module and the encrypted data are down-linked to the client through the HTTP service. Then, the private key remained in the WAE executing environment is used to decrypt the encryption data and then the decryption plain text is transferred to be displayed with the original form through a WML format document.

2. Key Management

The applications and services for assisting the public key encryption system can be viewed as a part of the public key base construction. The responsibility of the key management in the present invention includes a) key generation and conditions; b) sharing of the key.

a) Key Generation and Condition

An ideal key must be generated randomly, unpredictable, and is kept in secret. Furthermore, for the keys demanded and updated frequently are generated by a pseudo random process. Other than the property of unpredictability. The key management of the present invention must satisfy some specific algorithm. For example, the keys in the RSA system must have enhanced prime numbers, and other properties.

b) Sharing the Keys:

In the aspect of sharing the keys, other than providing the privacy and secret of the files and data through encryption technologies, the computer system must assure that the encryption data must be restored. The key management of the present invention has the mechanism of secret sharing, in that a key is divided into several key shadows. The original key is restored if only several key shadows of a specific number is combined. When the key is lost or destroyed, the data encryption through this key can not be restored.

Figure 9:
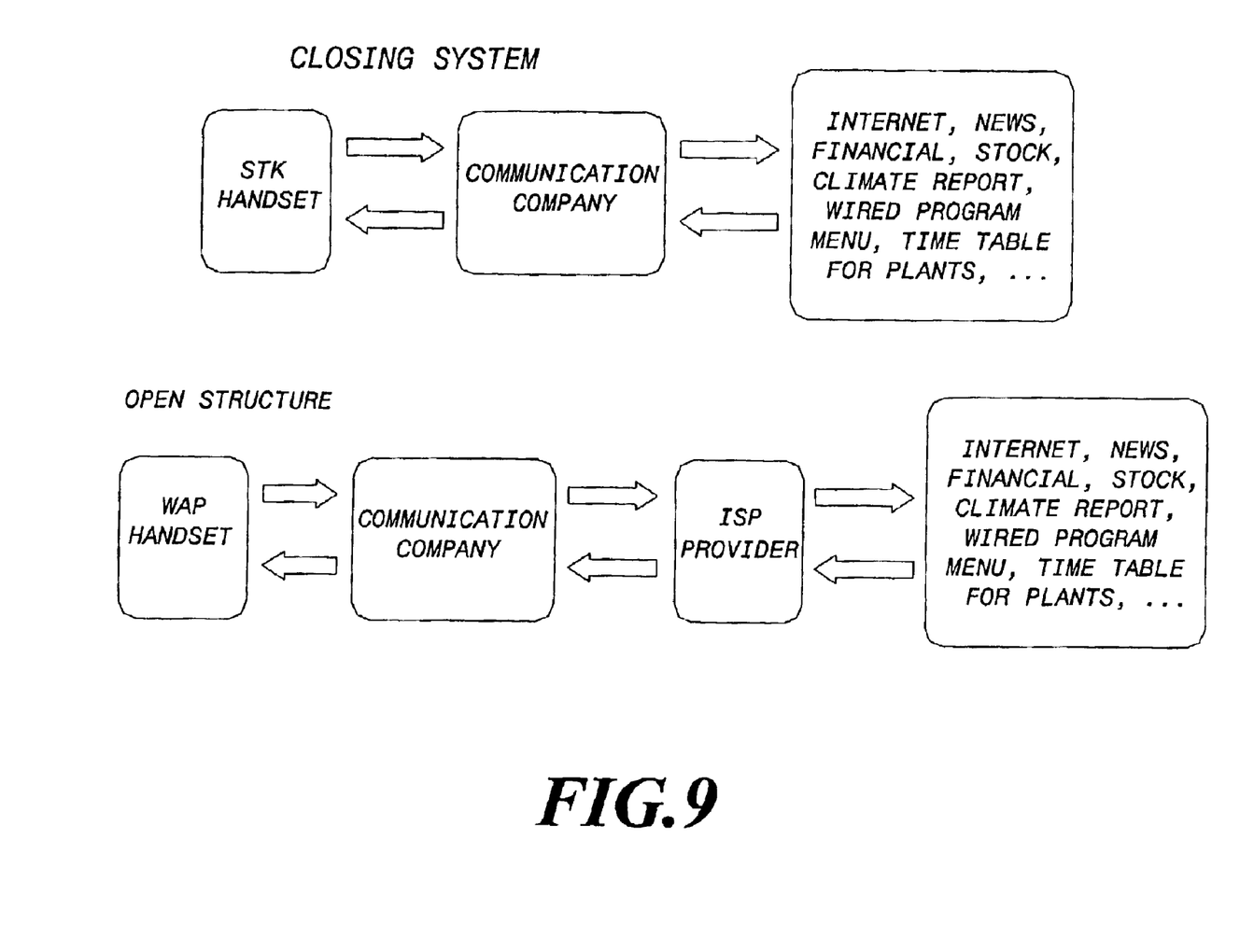
FIG. 9 shows the contrast of the constructions of the WAP and STK in the present invention.
Figure 10:
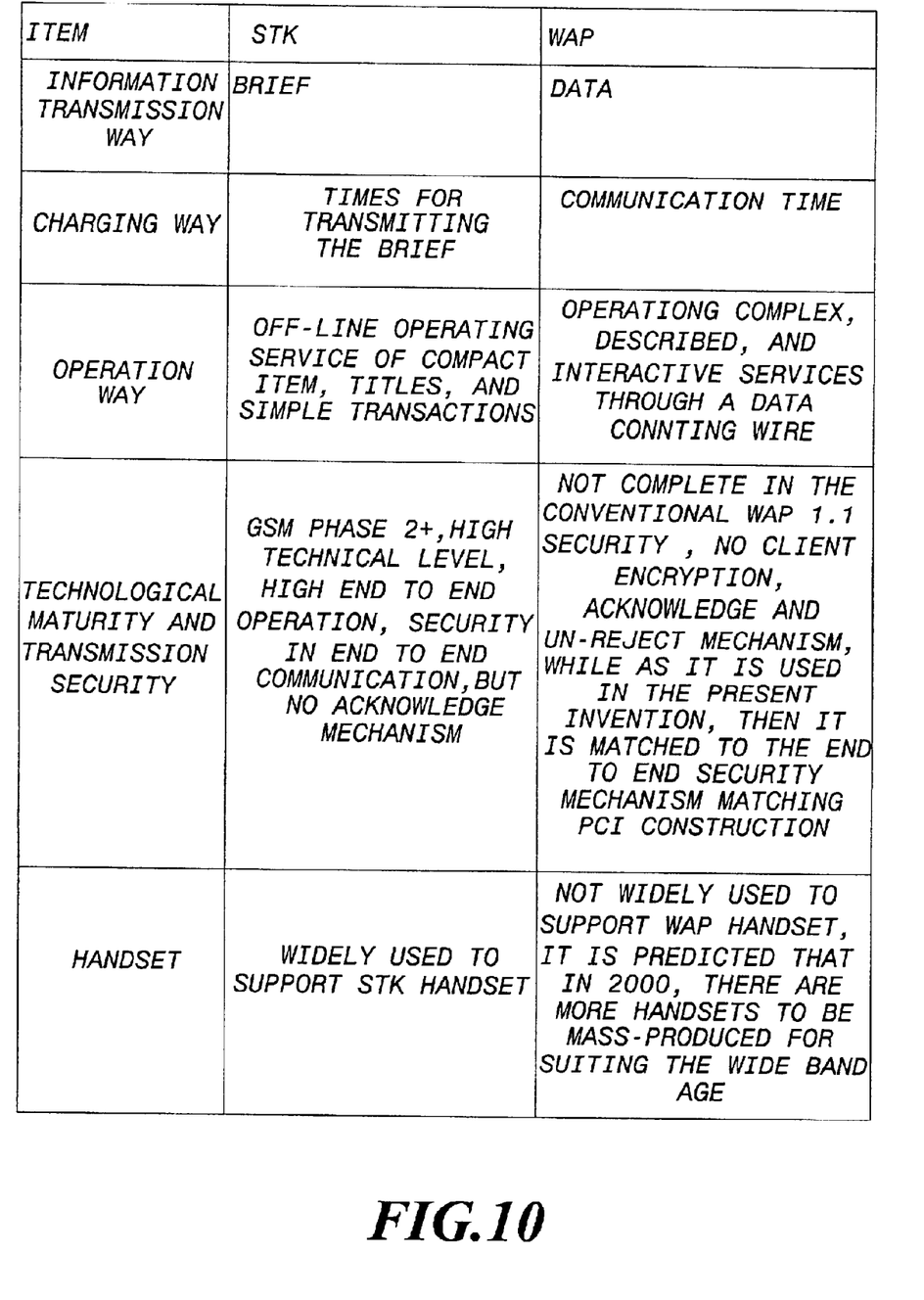
FIG. 10 shows the contrast of the features of WAP and STK in the present invention.
Figure 11:
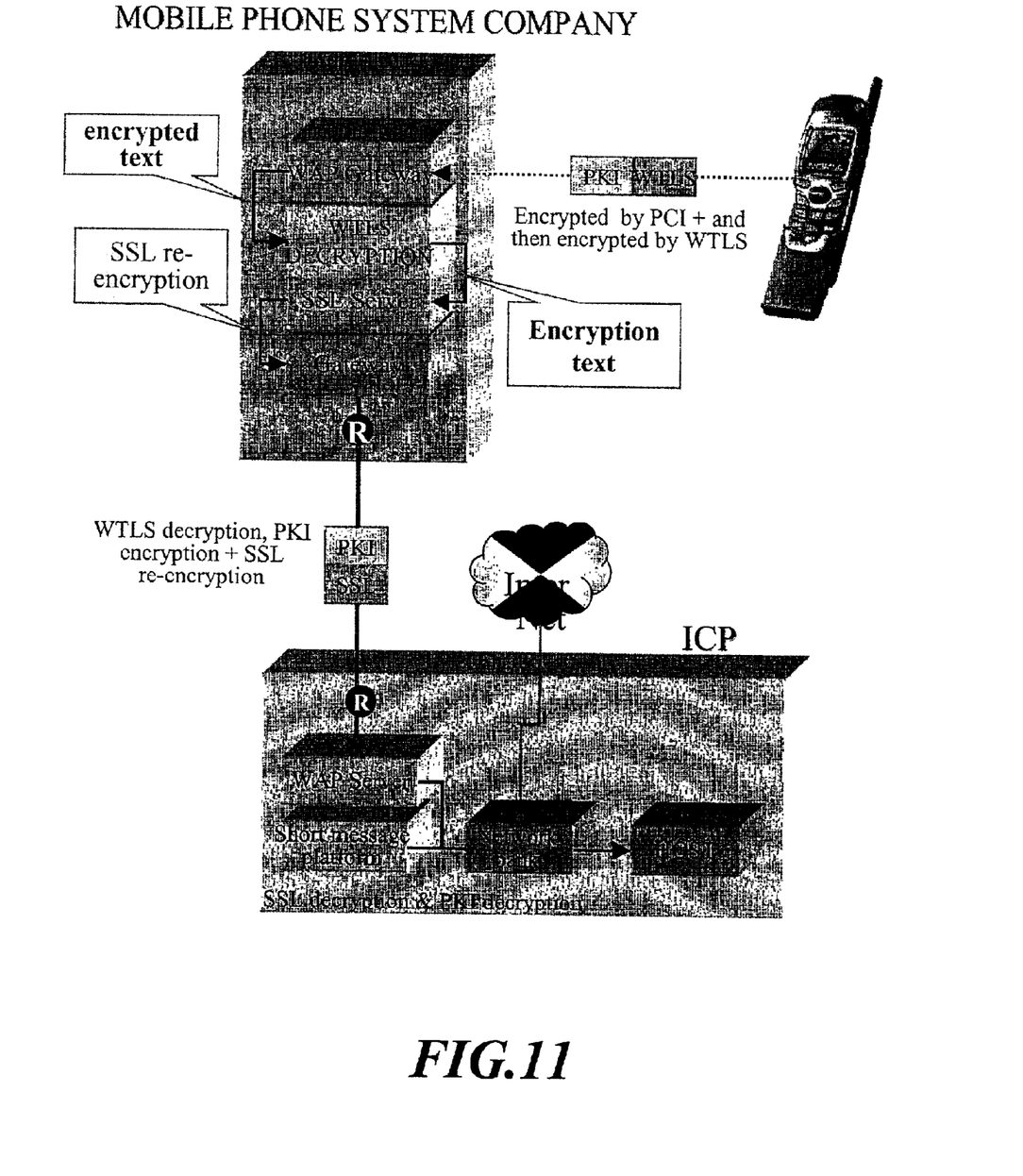
FIG. 11 shows the construction of the WAP end to end encryption of the present invention being used to a finical market in the present invention.

Comparison of the Encryption Mechanism of the Present Invention with the STK (STM Toolkit):

Because in the public key encryption system, no key is necessary to be exchanged in advance for achieving the advantage of secret communication. In the present invention, the end to end real-time encrypting process of a mobile commerce WAP data transmission section and the module of the same are designed based on the "public key encryption system". This is completely different from the encryption mechanism used in the conventional mobile phone STK (SIM Tool kit) transmission in which a symmetric key encryption system (such as PIN1, PIN3, 3DES) is used. In the application of SIM Tookit (subscriber identity module application toolkit), the mobile phone company cooperates with the SIM card manufacturer to record some extra paying services on the microprocessor of the client identification card. Thereby, the user may select the service directly on the menu of the handset. Since the STK transfers SMS (short message signal) through a handset matching the specification of GSM Phase +2, basically, the data is exchanged in the intranet of the communication company. Therefore, conventionally, the STK has a higher security in the e-commerce than the WAP construction. While this closing construction is not suitable for the mobile commerce application based on Internet. Although the symmetric key encryption system is beneficial to keep the data in secret, this system has no the "un-reject" function for identifying the user. Thus, the application is confined (referring to FIG. 9). Therefore, the information security system of the present invention, a public key mechanism is directly used to the WAP construction. Not only the defect of insufficient encryption in the conventional WAP construction is improved by the present invention, but also the "un-reject" property in the digital signature" is complete. This is a novel feature of the present invention (referring to FIG. 10).

In summary, the present invention relates to an end to end real-time encrypting process of a mobile commerce WAP data transmission section and the module of the same. The feature thereof is that a wireless application protocol is used as a technical platform. An information encryption code security system matching a public key infrastructure is installed in the WML server end of the current mobile server of a wireless service provider. By the added mechanism, the end to end security of the WAP mobile commerce information exchange is realized so as to improve the defect of the 2-phase security in the current WAP (edition 1.1) construction. Furthermore, the encryption and decryption principle of the public key mechanism is used in the present invention. The public key and private key generated by the key management are used alternatively, and thus, not only it can be used to the object of encryption, but also the "un-reject" function in certification acknowledge (CA) is achieved. Therefore, the possibility of realizing mobile commerce is improved greatly. Another, to solve the defect of low efficiency in mobile commerce, in the present invention, a pre-compressor is installed in the handset software encryption and decryption module. The pre-compressor with a compressing ratio of one third and 0 distortion is used to process the original plane text so as to greatly increase the efficiency of the handset. Consequently, the application of the present invention to be used in mobile commerce is improved.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

Attachment: Handset encryption and decryption module and M-H algorithm example

```
extern function Cipher(szTime, szURL, PublicK,
    CompressParam, B10)
{
if(String.compare(WMLBrowser.getVar("CompressInput"),
    "1")!=0) WMLBrowser.go("http://"+szURL+
    "?RtnCode=NoCompress&Time="+szTime);
var Encode=" ";
var CharPlainBit=" ";
var nCipher=0;
var i=0, j=0;
var nLen=0;
var nValue=0;
nLen=String.length(B10);
nLen=nLen div 3;
for(i=0; i<nLen; i++)
{
nValue=Lang.parseInt(String.subString(B10, i*3,3));
CharPlainBit=GenerateCharPlainBit(nValue);
nCipher=GenerateCharcipher(CharPlain Bit,PublicK);
if(j==0 && i==0)
Encode=Encode+nCipher;
else
Encode=Encode+"-"+nCipher
}
Encode=Encode+"-"+CompressParam;
WMLBrowser.setVar("CompressInput", "0");
WMLBrowser.go("http://"+szURL+"?Cipher="+Encode+
    "&RtnCode=Success&Time="+szTime);
}
function GenerateCharPlainBit(Plain)
{
var nLen=1;
var mod1=0;
var mod2=0;
var bit=0;
var nChar=0;
var cChar=" ";
var PlainBit=" ";
var i=0;
var nRate=2;
nChar=Plain;
for(i=0;i<8;i++)
{
mod1=nChar % nRate;
if(nRate==2)
mod2=0;
else
mod2=nChar%(nRate div 2);
bit=mod1-mod2;
if(bit==0)
PlainBit="0"+PlainBit;
else
PlainBit="1 "+PlainBit;
nRate=nRate*2;
}
return PlainBit;
}
function GenerateCharcipher(CharPlainBit,PublicK)
{
var cChar=" ";
var nChar=0;
var nCipher=0;
var i=0;
var PublicChar=" ";
for(i=0;i<8;i++)
{
cChar=String.charAt(CharPlainBit,i);
if(String.compare(cChar,"0")==0)
nChar=0;
else
nChar=1;
PublicChar=String.elementAt(PublicK,i,"-");
nCipher=nCipher+nChar*Lang.parseInt(PublicChar);
}
return nCipher;
}
```

What is claimed is:

1. An end to end real-time encrypting module of a mobile commerce WAP data transmission section, wherein the uppermost layer of the wireless application environment (WAE) is used as a developing platform and executing environment and is suitable for various communication networks, comprising at least one of GSM, PDC, CDPD, CDMA, TDMA, PHS, DECT, or GPRS and third generation mobile phone (3G) the real-time encrypting module comprising:

an information encryption code security system matching the public key infrastructure being installed in a WML server end of a current mobile server of a wireless service provider; and the system includes a handset software encryption and decryption module, a cipher server, and a key management, said key management randomly generating an ideal key, said ideal key being stored and held secretly, said key management further generating a second set of keys which are in high demand and are frequently updated by a pseudo-random process, said key management further performing a secret sharing process wherein an original key is divided into a plurality of key shadows, said original key being restored only when a selected number of key shadows are combined, said original key being non-recoverable when said original key is lost or destroyed; and, a pre-compressor for compression of transmission data, said pre-compressor performing the pre-compression processing steps including:

a) dividing original data into a plurality of unit character strings, each said character string having 8 or 9 characters;
b) converting each said unit character string into a decimal value;
c) converting each said decimal value into a unit character string of hexadecimal characters;
d) dividing each said hexadecimal character into two unit character sets;
e) converting each said unit character set into a decimal character code between 0 and 255; and,
f) converting each said character code into a respective ANSI character set.

2. The end to end real-time encrypting module of a mobile commerce WAP data transmission section as claimed in claim 1, wherein when an user registers into the WML server of WCP through a WAP network, the WML server will inform the cipher server to be responsible for actuating a public key remained in the handset software encryption and decryption module and the key management through the cipher server for the inter-process communication interface provided by operation systems of various computers; the public key is downloaded to the client, comprising at least one of a mobile phone or a personal digital assistant, using HTTP service through a WAP gateway of WAN (wide area network), GSM/GPRS/CDMA and other digital mobile system.

3. The end to end real-time encrypting module of a mobile commerce WAP data transmission section as claimed in claim 1, wherein when it is desired to down-link personal commercial information, a user inputs a private key to be left in the stack memory of the mobile WAE environment as a standby key, further when the WML server transfers the personal commercial information to be down-linked to the cipher server, the WML server informs the cipher server to open the public key remaining in the handset software encryption and decryption module and key management for executing an encryption algorithm in the server end in advance; further, the handset software encryption and decryption module and the encrypted data are down-linked to a client through the HTTP service; then, the private key remaining in the WAE executing environment is used to decrypt the encryption data and then the decryption plain text is transferred to display the original form through a WML format document.

4. The end to end real-time encrypting module of a mobile commerce WAP data transmission section as claimed in claim 1, wherein in the security mechanism, the handset software encryption and decryption module are based on the WAE application layer, and thus are used to interpret wireless markup language and wireless markup script language.

* * * * *